(12) United States Patent
Zach et al.

(10) Patent No.: US 11,258,646 B2
(45) Date of Patent: Feb. 22, 2022

(54) WAVEFORM OPTIMIZATION OF PEAK-TO-AVERAGE POWER RATIO WITH INTER-CELL COORDINATION

(71) Applicant: QUALCOMM Incorporated, San Diego, CA (US)

(72) Inventors: Noam Zach, Kiryat Ono (IL); Guy Wolf, Rosh Haayin (IL); Ory Eger, Tel Aviv (IL); Sharon Levy, Binyamina (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/902,121

(22) Filed: Jun. 15, 2020

(65) Prior Publication Data

US 2021/0266209 A1 Aug. 26, 2021

Related U.S. Application Data

(60) Provisional application No. 62/979,972, filed on Feb. 21, 2020.

(51) Int. Cl.
*H04L 27/26* (2006.01)
*H04W 52/36* (2009.01)
*H04W 24/10* (2009.01)
*H04W 72/04* (2009.01)
*H04W 88/14* (2009.01)

(52) U.S. Cl.
CPC ......... *H04L 27/2614* (2013.01); *H04W 24/10* (2013.01); *H04W 52/365* (2013.01); *H04W 72/046* (2013.01); *H04W 88/14* (2013.01)

(58) Field of Classification Search
CPC ........... H04L 27/2614; H04L 27/2618; H04W 24/10; H04W 52/365
See application file for complete search history.

*Primary Examiner* — James P Duffy
(74) *Attorney, Agent, or Firm* — Holland & Hart LLP

(57) ABSTRACT

Methods, systems, and devices for wireless communications are described. An interfering base station may transmit to a neighboring base station a configuration to measure beam resources for a plurality of PAPR reduction beams. The neighboring base station may forward this measurement configuration to an associated UE. The UE may then take measurements of the interfering base station's PAPR reduction beams in accordance with the configuration and transmit the report to its serving base station. The neighboring base station may then compile a headroom report and transmit the headroom report to the interfering base station. The interfering base station may then adjust its PAPR reduction beams based on the headroom report.

30 Claims, 14 Drawing Sheets

|  | k | k+1 | k+2 | k+3 | k+4 |
|---|---|---|---|---|---|
| PAPR reduction beam $i$ | +10 dBm | +10 dBm | +10 dBm | +10 dBm | +10 dBm |

|  | k | k+1 | k+2 | k+3 | k+4 |
|---|---|---|---|---|---|
| Adjusted PAPR reduction beam $i$ | +3 dBm | +10 dBm | +4 dBm | +10 dBm | +15 dBm |

WAVEFORM OPTIMIZATION OF PEAK-TO-AVERAGE POWER RATIO WITH INTER-CELL COORDINATION

CROSS REFERENCE

The present application for Patent claims the benefit of U.S. Provisional Patent Application No. 62/979,972 by ZACH et al., entitled "WAVEFORM OPTIMIZATION OF PEAK-TO-AVERAGE POWER RATIO WITH INTER-CELL COORDINATION," filed Feb. 21, 2020, assigned to the assignee hereof, and expressly incorporated by reference herein.

BACKGROUND

The following relates generally to wireless communications, and more specifically to waveform optimization of peak-to-average power ratio with inter-cell coordination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Multiple-input multiple-output (MIMO) systems serve to provide higher throughput and better quality-of-service for multiple-access systems. MIMO systems utilize techniques for multiplying the capacity of a radio link using multiple transmit and receive antennas to exploit multipath propagation. In practice, broadband wireless communications may suffer from frequency-selective fading. Orthogonal frequency division multiplexing (OFDM), a scheme of encoding digital data on multiple carrier frequencies, has been widely used to deal with frequency-selective fading. The combination of MIMO with beamforming and OFDM signaling achieves high data rates with a wide coverage area due in part to a high beamforming gain. However, OFDM consists of a large number of independent subcarriers which may result in situations where the amplitude of signals may have high peak values. The peak-to-average power ratio (PAPR) of a transmitted signal is one of the main challenges in OFDM or MIMO-OFDM.

SUMMARY

The described techniques relate to improved methods, systems, devices, and apparatuses that support waveform optimization of peak-to-average power ratio with inter-cell coordination. Generally, the described techniques provide for dynamically adjusting PAPR reduction beams for interference mitigation at neighboring user equipments (UEs). An interfering base station may transmit to a neighboring base station a configuration to measure beam resources for a plurality of PAPR reduction beams. The neighboring base station may forward this measurement configuration to an associated UE. The UE may then take measurements of the interfering base station's PAPR reduction beams in accordance with the configuration and transmit the report to its serving base station. The neighboring base station may then compile a headroom report and transmit the headroom report to the interfering base station. The interfering base station may then adjust its PAPR reduction beams based on the headroom report.

A method of wireless communication by a first base station is described. The method may include transmitting, to a second base station, a measurement configuration for measurement of a set of beam resources for a first set of peak-to-average power ratio (PAPR) reduction beams, transmitting, via the set of beam resources, a set of reference signals via the first set of PAPR reduction beams in accordance with the measurement configuration, receiving a headroom report indicating available headroom based on an energy measurement reported for the set of beam resources by a UE served by the second base station, and transmitting signals via a second set of PAPR reduction beams based on the headroom report.

An apparatus for wireless communication by a first base station is described. The apparatus may include a processor, memory coupled with the processor, and instructions stored in the memory. The instructions may be executable by the processor to cause the apparatus to transmit, to a second base station, a measurement configuration for measurement of a set of beam resources for a first set of peak-to-average power ratio (PAPR) reduction beams, transmit, via the set of beam resources, a set of reference signals via the first set of PAPR reduction beams in accordance with the measurement configuration, receive a headroom report indicating available headroom based on an energy measurement reported for the set of beam resources by a UE served by the second base station, and transmit signals via a second set of PAPR reduction beams based on the headroom report.

Another apparatus for wireless communication by a first base station is described. The apparatus may include means for transmitting, to a second base station, a measurement configuration for measurement of a set of beam resources for a first set of peak-to-average power ratio (PAPR) reduction beams, transmitting, via the set of beam resources, a set of reference signals via the first set of PAPR reduction beams in accordance with the measurement configuration, receiving a headroom report indicating available headroom based on an energy measurement reported for the set of beam resources by a UE served by the second base station, and transmitting signals via a second set of PAPR reduction beams based on the headroom report.

A non-transitory computer-readable medium storing code for wireless communication by a first base station is described. The code may include instructions executable by a processor to transmit, to a second base station, a measurement configuration for measurement of a set of beam resources for a first set of peak-to-average power ratio (PAPR) reduction beams, transmit, via the set of beam resources, a set of reference signals via the first set of PAPR reduction beams in accordance with the measurement configuration, receive a headroom report indicating available headroom based on an energy measurement reported for the set of beam resources by a UE served by the second base station, and transmit signals via a second set of PAPR reduction beams based on the headroom report.

In some examples of the method, apparatuses, and non-transitory computer-readable medium described herein, transmitting the signals via the second set of PAPR reduction beams further may include operations, features, means, or instructions for transmitting a signal via at least one PAPR reduction beam of the second set of PAPR reduction beams at a different power from a corresponding PAPR reduction beam of the first set of PAPR reduction beams based on the headroom report.

In some examples of the method, apparatuses, and non-transitory computer-readable medium described herein, each PAPR reduction beam of the first set of PAPR reduction beams may be transmitted in a respective transmission time interval of a resource allocation, and where transmitting the signals via the second set of PAPR reduction beams further may include operations, features, means, or instructions for transmitting at least one PAPR reduction beam of the second set of PAPR reduction beams in a different transmission time interval within the resource allocation than a corresponding PAPR reduction beam of the first set of PAPR reduction beams.

Some examples of the method, apparatuses, and non-transitory computer-readable medium described herein may further include operations, features, means, or instructions for determining that the UE may be not scheduled to communicate in a resource in which transmission of the signals may be scheduled to occur, and where transmitting the signals via the second set of PAPR reduction beams further includes, and transmitting a signal via at least one PAPR reduction beam of the second set of PAPR reduction beams with beam characteristics selected to achieve a desired PAPR level based on the determination.

Some examples of the method, apparatuses, and non-transitory computer-readable medium described herein may further include operations, features, means, or instructions for determining an adjustment of at least one PAPR reduction beam of the second set of PAPR reduction beams based on the headroom report.

In some examples of the method, apparatuses, and non-transitory computer-readable medium described herein, transmitting the signals via the second set of PAPR reduction beams further may include operations, features, means, or instructions for transmitting a signal via at least one PAPR reduction beam of the second set of PAPR reduction beams in at least a partially overlapping direction with a serving beam based on the headroom report.

Some examples of the method, apparatuses, and non-transitory computer-readable medium described herein may further include operations, features, means, or instructions for determining one or more PAPR reduction beams to be used for transmission of the first set of PAPR reduction beams, and determining the measurement configuration based on the determined one or more PAPR reduction beams.

In some examples of the method, apparatuses, and non-transitory computer-readable medium described herein, the headroom report includes available headroom per beam, per transmission time interval, per frequency sub-band, or a combination thereof, for each of the determined one or more PAPR reduction beams.

Some examples of the method, apparatuses, and non-transitory computer-readable medium described herein may further include operations, features, means, or instructions for transmitting the measurement configuration via an integrated access and backhaul (IAB) link.

In some examples of the method, apparatuses, and non-transitory computer-readable medium described herein, the IAB link may be in a same frequency band as at least one PAPR reduction beam of the first set of PAPR reduction beams.

A method of wireless communication by a UE is described. The method may include receiving, from a first base station, a measurement configuration measuring a set of beam resources for a set of peak-to-average power ratio (PAPR) reduction beams associated with a second base station, monitoring, in accordance with the measurement configuration, energy levels of the set of beam resources via the set of PAPR reduction beams, and transmitting, to the first base station, a measurement report indicating the monitored energy levels.

An apparatus for wireless communication by a UE is described. The apparatus may include a processor, memory coupled with the processor, and instructions stored in the memory. The instructions may be executable by the processor to cause the apparatus to receive, from a first base station, a measurement configuration measuring a set of beam resources for a set of peak-to-average power ratio (PAPR) reduction beams associated with a second base station, monitor, in accordance with the measurement configuration, energy levels of the set of beam resources via the set of PAPR reduction beams, and transmit, to the first base station, a measurement report indicating the monitored energy levels.

Another apparatus for wireless communication by a UE is described. The apparatus may include means for receiving, from a first base station, a measurement configuration measuring a set of beam resources for a set of peak-to-average power ratio (PAPR) reduction beams associated with a second base station, monitoring, in accordance with the measurement configuration, energy levels of the set of beam resources via the set of PAPR reduction beams, and transmitting, to the first base station, a measurement report indicating the monitored energy levels.

A non-transitory computer-readable medium storing code for wireless communication by a UE is described. The code may include instructions executable by a processor to receive, from a first base station, a measurement configuration measuring a set of beam resources for a set of peak-to-average power ratio (PAPR) reduction beams associated with a second base station, monitor, in accordance with the measurement configuration, energy levels of the set of beam resources via the set of PAPR reduction beams, and transmit, to the first base station, a measurement report indicating the monitored energy levels.

In some examples of the method, apparatuses, and non-transitory computer-readable medium described herein, the measurement configuration may include operations, features, means, or instructions for monitoring, in accordance with the measurement configuration, for the one or more PAPR reduction beams.

In some examples of the method, apparatuses, and non-transitory computer-readable medium described herein, the measurement report includes an energy measurement per beam, per transmission time interval, per frequency sub-band, or a combination thereof, for each of the one or more PAPR reduction beams.

A method of wireless communication by a first base station is described. The method may include receiving, from a second base station, measurement configuration for measurement of a set of beam resources for a set of peak-to-average power ratio (PAPR) reduction beams associated with the second base station, transmitting the measurement configuration to a UE served by the first base station, receiving, from the UE, a measurement report indicating an energy measurement of the set of beam resources via the set of PAPR reduction beams, and transmitting a headroom report indicating available headroom based on the measurement report.

An apparatus for wireless communication by a first base station is described. The apparatus may include a processor, memory coupled with the processor, and instructions stored in the memory. The instructions may be executable by the processor to cause the apparatus to receive, from a second base station, measurement configuration for measurement of a set of beam resources for a set of peak-to-average power ratio (PAPR) reduction beams associated with the second base station, transmit the measurement configuration to a UE served by the first base station, receive, from the UE, a measurement report indicating an energy measurement of the set of beam resources via the set of PAPR reduction beams, and transmit a headroom report indicating available headroom based on the measurement report.

Another apparatus for wireless communication by a first base station is described. The apparatus may include means for receiving, from a second base station, measurement configuration for measurement of a set of beam resources for a set of peak-to-average power ratio (PAPR) reduction beams associated with the second base station, transmitting the measurement configuration to a UE served by the first base station, receiving, from the UE, a measurement report indicating an energy measurement of the set of beam resources via the set of PAPR reduction beams, and transmitting a headroom report indicating available headroom based on the measurement report.

A non-transitory computer-readable medium storing code for wireless communication by a first base station is described. The code may include instructions executable by a processor to receive, from a second base station, measurement configuration for measurement of a set of beam resources for a set of peak-to-average power ratio (PAPR) reduction beams associated with the second base station, transmit the measurement configuration to a UE served by the first base station, receive, from the UE, a measurement report indicating an energy measurement of the set of beam resources via the set of PAPR reduction beams, and transmit a headroom report indicating available headroom based on the measurement report.

Some examples of the method, apparatuses, and non-transitory computer-readable medium described herein may further include operations, features, means, or instructions for determining the available headroom based on the energy measurement and a target Signal to Noise and Interference Ratio (SINR) for decoding of a granted modulation and coding scheme used for transmissions to the UE via the first base station.

In some examples of the method, apparatuses, and non-transitory computer-readable medium described herein, the measurement configuration may be received and the headroom report may be transmitted via an integrated access and backhaul (IAB) link.

In some examples of the method, apparatuses, and non-transitory computer-readable medium described herein, the IAB link may be in a same frequency band as at least one PAPR reduction beam of the set of PAPR reduction beams.

In some examples of the method, apparatuses, and non-transitory computer-readable medium described herein, the measurement configuration includes a configuration for transmission of one or more PAPR reduction beams, and where the measurement report includes an energy measurement per beam, per transmission time interval, per frequency sub-band, or a combination thereof, for each of the one or more PAPR reduction beams.

DETAILED DESCRIPTION

Figure 1:
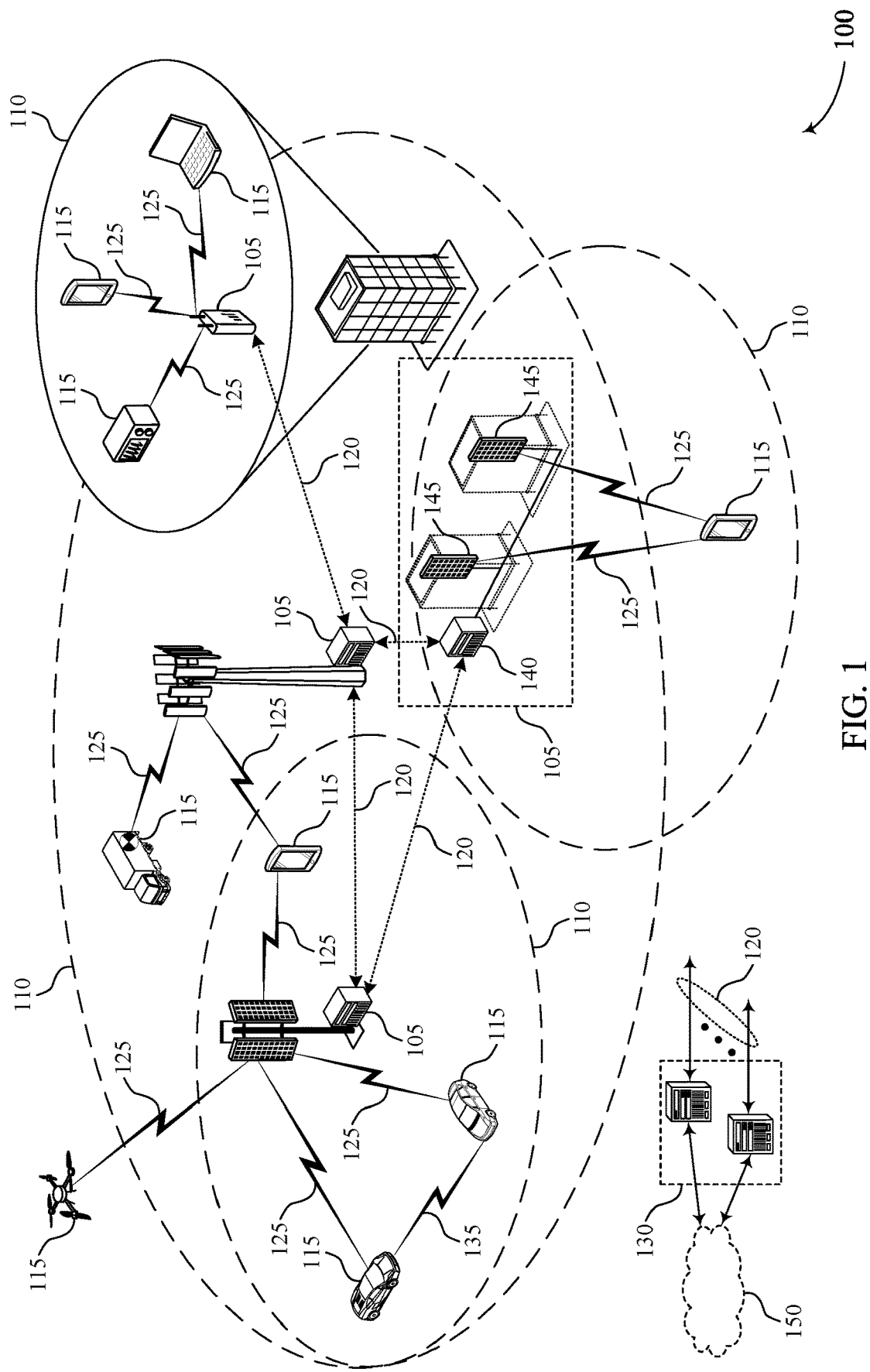
FIG. 1 illustrates an example of a system for wireless communications in accordance with aspects of the present disclosure.

A device in a wireless communications system may apply a transmit power to a signal to transmit the signal over a wireless channel to a receiving device. The signal may be transmitted with a waveform, such as an OFDM waveform. The power input to a power amplifier to generate the signal may generally have a linear relationship to an output power of the power amplifier up until an input saturation power. In some cases, the efficiency of the power amplifier is higher as the output power level is higher, and thus the power input of the power amplifier may be applied to a level that does not exceed a pre-determined percentage of clipped signals (e.g., allowing up to 0.001 of the samples to be clipped). When the input power exceeds the input saturation power, the signal may be distorted in a non-linear manner. In some cases, the amount of back off applied to a signal may be based on a PAPR of the signal. PAPR is widely used in measuring the degree to which peaks in time-domain signals occur. Some systems support techniques to reduce PAPR, thereby improving efficiency for the transmitter.

MIMO-OFDM suffers from a potentially high PAPR at the transmit antennas caused by the superposition of multiple sub-channel signals in the time domain, and also transmission power variation among transmission antennas due to beamforming in addition to the multicarrier-based OFDM signaling. A technique used to mitigate high PAPR in MIMO-OFDM may exploit the unique space-user characteristics of MIMO-OFDM systems. For example, a technique may exploit the degrees of freedom in the null-space of the channel matrix where injecting energy into the channel null-space may serve to minimize the peak power at the base antennas. In other words, a wireless communication system may restrict the transmission of a PAPR reduction beam (or PAPR beam) to at least some of the null space(s) of the MIMO channel.

However, the transmission of PAPR beams to reduce the PAPR at the transmit antennas may have unintended consequences. For example, the transmitted PAPR beams may provide high levels of interference for other cells and for wireless devices associated with those cells. Some conventional methods of utilizing PAPR reduction beams may utilize a pseudo-omni PAPR reduction signal which transmits an omni-directional PAPR reduction signal without regard for interference caused to neighboring devices, such as neighboring UEs or IAB nodes. Devices in a wireless communications system described herein may implement techniques for inter-cell coordination to optimize PAPR beams. For example, an interfering base station may transmit a measurement configuration to a neighboring base station identifying a set of beam resources to be measured for a plurality of PAPR beams from the interfering base station. The neighboring base station may then relay the measurement configuration to a user equipment (UE) associated with the neighboring base station. The interfering base station may then transmit the pilot or reference signals via the PAPR beams in accordance with the beam resources. The UE may then measure the signal energy associated with the reference signals and send a measurement report to the neighboring cell. The neighboring base station may then determine a headroom report from the measurement report which may detail the allowed interference power levels of each PAPR beam based on required signal-to-noise ratios (SNR) in the receive antennas of its served UEs. The neighboring base station may transmit the headroom report to the interfering base station and the interfering base station may adjust one or more of its PAPR beams in response to the headroom report.

Aspects of the disclosure are initially described in the context of a wireless communications system. Aspects of the disclosure are further illustrated by and described with reference to apparatus diagrams, system diagrams, and flowcharts that relate to waveform optimization of peak-to-average power ratio with inter-cell coordination.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Devices in a wireless communications system described herein may implement techniques for inter-cell coordination to enhance PAPR beams. For example, an interfering base station may transmit a measurement configuration to a neighboring base station identifying a set of beam resources to be measured for a plurality of PAPR beams from the interfering base station. The neighboring base station may then relay the measurement configuration to a user equipment (UE) associated with the neighboring base station. The interfering base station may then transmit the pilot or reference signals via the PAPR beams in accordance with the beam resources. The UE may then measure the signal energy associated with the reference signals and send a measurement report to the neighboring cell. The neighboring base station may then determine a headroom report from the measurement report which may detail the allowed interference power levels of each PAPR beam based on required signal-to-noise ratios (SNR) in the receive antennas of its served UEs. The neighboring base station may transmit the headroom report to the interfering base station and the interfering base station may adjust one or more of its PAPR beams in response to the headroom report.

Figure 2:
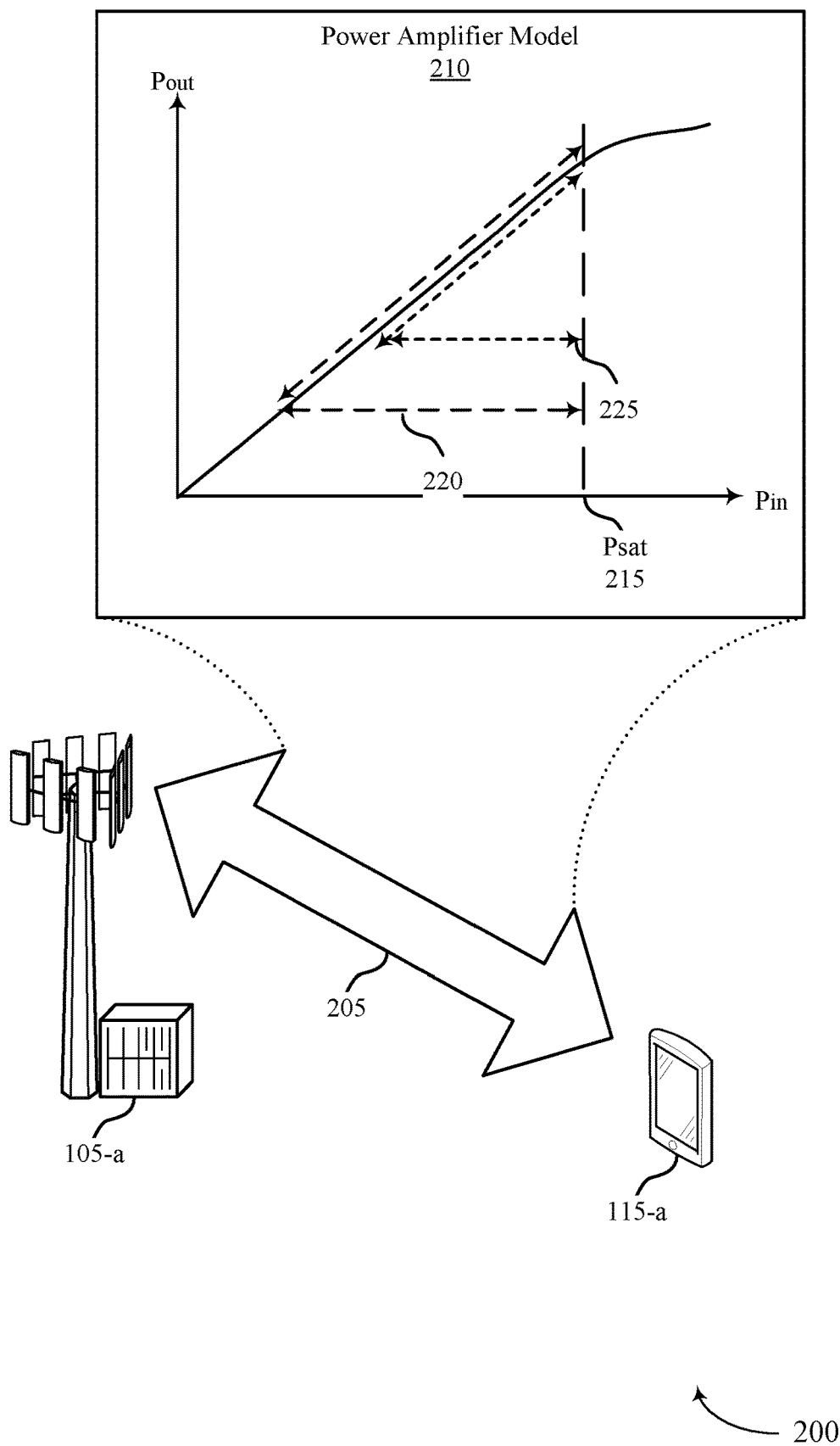
FIG. 2 illustrates an example of a wireless communications system in accordance with aspects of the present disclosure.

FIG. 2 illustrates an example of a wireless communication system 200 in accordance with aspects of the present disclosure. In some examples, wireless communication system 200 may implement aspects of wireless communication system 100. The wireless communications system 200 may include UE 115-a and base station 105-a, which may be respective examples of a UE 115 and a base station 105 as described with reference to FIG. 1. UE 115-a and base station 105-a may have an established wireless link 205, where UE 115-a may transmit to base station 105-a on an uplink channel of the established wireless link 205, or base station 105-a may transmit to UE 115-a on a downlink channel of the established wireless link 205.

A transmitting device in the wireless communications system 200 may apply a transmit power to a signal to send the signal over a wireless channel to a receiving device. For example, for a downlink transmission, base station 105-a may transmit a signal on a downlink channel with a certain transmit power to UE 115-a. In some cases, the signals may be transmitted with a waveform such as an OFDM waveform.

A power amplifier model 210 may show an example relationship between an input power to generate a signal and an output power of the signal at a transmitter. With a low input power, the relationship between the input power and the output power may be linear. However, when the input power exceeds an input saturation power 215 (e.g., $P_{SAT}$), the power amplifier model 210 may not be linear and become less efficient. For example, there may be a dropoff between input power and output power past the saturation power 215. In this case, a transmitter may apply an input back-off (IBO) to prevent saturation. Generally, the closer the input power is to the input power saturation 215 without exceeding the input power saturation 215, the higher the efficiency of the power amplifier. Therefore, it may be beneficial for a transmitter to apply a power as close to the input power saturation 215 as possible without exceeding the input power saturation 215.

Some waveforms may be considered inefficient for a transmitter, as the transmitter may implement a significant IBO at the power amplifier to avoid sample saturation. For example, with OFDM signals, the peak-to-average power ratio (PAPR) may reach a large value, and the input power back-off 220 considered may be IBO=PAPR$_{OFDM}$≅11 dB.

Some wireless communications systems support schemes for reducing PAPR. The transmitter may then boost the signal or otherwise benefit from operating at a more efficient working point at the power amplifier input. For example, some boosting the input power may provide better efficiency and less input dynamic range at the power amplifier input. In some cases, some schemes may support using a smaller IBO (e.g., using IBO 225 instead of IBO 220), which may improve power efficiency without degrading the signal. A scheme that may utilize IBO 225 may involve projecting PAPR reduction beams onto the orthogonal (or null) subspace relative to a subspace for one or more serving beams.

Figure 3:
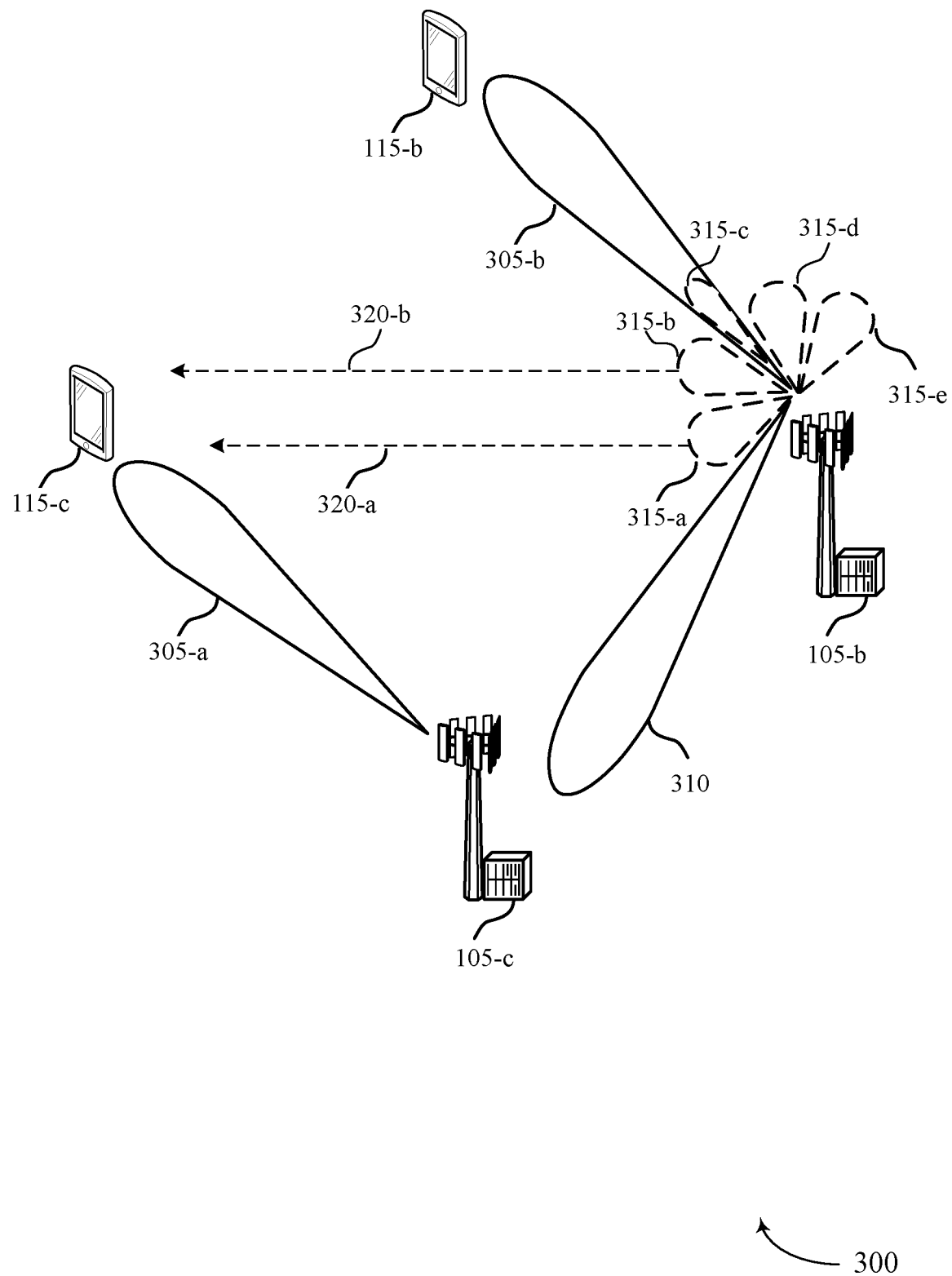
FIG. 3 illustrates an example of a wireless communications system in accordance with aspects of the present disclosure.

FIG. 3 illustrates an example of a wireless communication system 300 in accordance with aspects of the present disclosure. In some examples, wireless communication system 300 may implement aspects of wireless communication system 100. The wireless communications system 300 may include UE 115-b and UE 115-c, and base station 105-b and base station 105-c, which may be respective examples of a UE 115 and a base station 105 as described with reference to FIGS. 1 and 2. Base station 105-b may communicate with UE 115-b via serving beam 305-b, and base station 105-c may communicate with UE 115-c via serving beam 305-a. Base station 105-b may communicate with base station 105-c via integrated access and backhaul (IAB) link 310.

Base station 105-b may utilize PAPR reduction beams 315 for reducing its PAPR. Although base station 105-b is illustrated with PAPR reduction beams 315-a, 315-b, 315-c, 315-d, and 315-e, base station 105-b may transmit more or less PAPR reduction beams. PAPR reduction beam 315-c may be transmitted in at least a partially overlapping direction with service beam 305-b. Determining a PAPR reduction beam may involve the following steps. In equation (1), a frequency domain signal may be constructed for all served layers using a precoding matrix matching the channel conditions.

$$z=Wx \qquad (1)$$

Here $W_{[P \times B]}$ is the precoding matrix and $x_{[B \times 1]}$ is the OFDM frequency-user domain vector. (P is the number of transmitting antennas and B is the number of served layers.) Next an interpolated TD signal a may be determined in equation (2).

$$\alpha = \text{ifft}\{z\} \qquad (2)$$

Here z is zero padded with the guard bands and signal over sampling, and ifft is an inverse fast fourier transform. Then the interpolated signal a may be clipped in equation (3).

$$\hat{a} = \text{clip}\{a\} \qquad (3)$$

The clipped signal â may then be transformed using a fast fourier transform (fft) to the frequency domain in equation (4).

$$\hat{z} = \textit{fft}\{\hat{a}\} \qquad (4)$$

Then a PAPR reduction signal may be projected in the frequency-antenna-domain data with equation (5).

$$z_{next} = ((I - WW^{pinv}) + W\Lambda W^{pinv})(\hat{z}-z)+z \qquad (5)$$

Where Λ is the diagonal weight matrix with Λii representing the weight of interference on the $i^{th}$ layer. Adjusting one or more PAPR reduction beams in order to mitigate interference at a UE 115 may allow wireless communication system 300 to control per user frequency/spatially dependent error vector magnitude. Additional iterations may be performed starting with equation (2) until convergence.

However, the PAPR reduction beams 315 transmitted by base station 105-b may interfere with the communications of UE 115-c (via energy projections 320-a and 320-b from PAPR reduction beams 315-a and 315-b, respectively). The wireless communications system 300 may utilize techniques in order to mitigate the interference that UE 115-c may experience from PAPR reduction beams 315-a and 315-b. For example, base station 105-b may coordinate with base station 105-c to adjust its PAPR reduction beams such that neighboring UEs may experience less interference. For example, equation (5) may be adapted to account for the interference reported in the headroom report as follows in equation (6):

$$z_{next} = A((I - WW^{pinv}) + W\Lambda W^{pinv})(\hat{z} - z) + z \qquad (6)$$

where $(\hat{z}-z)$ is the PAPR reduction signal, $A \in C^{nT \times nT}$ is a matrix that scales the power used by the interfering base station to load the PAPR signal onto the PAPR beams, and A can be chosen for example to be: $\hat{W}W^{pinv}$, with $\hat{W}$ being a modified precoding matrix with power headroom constraints for each sub-beam/direction. The precoding matrix A may defined a codebook for the set of PAPR reduction beams.

In some examples, base station 105-*b* (an "interfering base station"), may send a measurement configuration to base station 105-*c* (a "neighboring base station"). The measurement configuration may contain a configuration of one or more of the PAPR reduction beams transmitted by base station 105-*b*. The measurement configuration may request energy measurements for specified PAPR beams in both time and frequency resources. The measurement configuration may be transmitted from base station 105-*b* to base station 105-*c* via IAB link 310. IAB link 310 may be transmitted in a same frequency band as at least one PAPR reduction beam 315. In concert with the measurement configuration, base station 105-*b* may transmit reference signals via PAPR reduction beams 315 on beam resources specified by the measurement configuration. Once base station 105-*c* receives the measurement configuration, it may transmit the measurement configuration to UE 115-*c* (a "neighboring UE") via serving beam 305-*a*.

In accordance with the measurement configuration, UE 115-*c* may monitor the energy levels of the specified beam resources via the reference signals transmitted through PAPR reduction beams 315. The energy level may be, for example, an interference level measurement and may be, for example, a signal to interference plus noise ratio (SINR), a received signal strength indicator (RSSI), Reference Signal Received Quality (RSRQ), Reference Signal Received Power (RSRP), or the like. Upon completion of the monitoring, UE 115-*c* may transmit the energy measurements to base station 105-*c* in a measurement report. The measurement report may consist of energy level measurements per beam, per transmission time interval, per frequency sub-band, or a combination thereof, for each of the PAPR reduction beams specified in the measurement configuration.

Upon receiving the measurement report from UE 115-*c*, base station 105-*c* may compile the energy measurements and create a headroom report. The headroom report may indicate the available headroom for each PAPR reduction beam such that they do not unduly interfere with the communications of UE 115-*c*. In some cases, the available headroom may be based on a required SNR in the receive antennas of UE 115-*c*. In an example, the available headroom may be a difference between an interference level observed by the UE 115-*c* within a resource and a target interference level to support a desired level of communication within the resource. For example, an MCS level may tolerate a defined amount of interference to achieve a desired throughput rate for a resource within an acceptable error rate (e.g., block error rate), and the available headroom may indicate how much additional interference can be supported for a particular MCS level. In addition to the available headroom per beam, the headroom report may include headroom per transmission time interval, per frequency sub-band, or a combination thereof, for each of the PAPR reduction beams specified in the measurement configuration.

In addition to the energy measurements of the specified beam resources, the available headroom may include a target signal to noise and interference ratio (SINR) for decoding of a granted modulation and coding scheme used for transmissions to UE 115-*c*. Base station 105-*c* may transmit the headroom report to base station 105-*b* via IAB link 310.

With the headroom report, base station 105-*b* may adjust one or more PAPR reduction beams 315 in order to mitigate interference at UE 115-*c*. For example, as determined for equation (6), the base station 105 may use the received headroom report to determine the PAPR reduction signal $(\hat{z}-z)$, the projection matrix $A \in C^{nT \times nT}$ that scales the power used by the interfering base station to load the PAPR signal onto the respective beams PAPR beams, and the precoding matrix A that applies power headroom constraints for each sub-beam and/or direction. It is noted that the base station 105-*b* may periodically, aperiodically, or trigger, one or more neighbor UEs to measure interference and for a neighbor base station 105-*c* to a provide headroom report to the base station 105-*b*. To manage interference that may change over time, the base station 105-*b* may use a latest one or more received headroom reports to adapt the PAPR reduction signal $(\hat{z}-z)$, the projection matrix $A \in C^{nT \times nT}$, and the precoding matrix A to account for interference caused by transmission of the PAPR rejection signal via the one or more PAPR beams, to control the amount of interference caused to neighboring devices.

For example, the energy transmitted for each PAPR reduction beam 315 may be adjusted on a beam level, in time, or in frequency. For example, signals of PAPR reduction beam 315-*a* and/or PAPR reduction beam 315-*b* may be transmitted at a different power than they were originally transmitted based on the headroom report. In another example, signals of PAPR reduction beam 315-*a* and/or PAPR reduction beam 315-*b* may be transmitted in a different time interval within a resource allocation than they were originally transmitted. Adjusting one or more PAPR reduction beams 315 in order to mitigate interference at UE 115-*c* may allow wireless communication system 300 to control per user frequency/spatially dependent error vector magnitude. Additionally, adjusting one or more PAPR reduction beams 315 may offer IAB link 310 higher modulation and coding scheme (MCS) and a higher transmit power (and thus a higher link budget).

In some cases, base station 105-*b* may determine that UE 115-*c* is not scheduled to communicate within a resource in which base station 105-*b* may transmit PAPR reduction signals. Base station 105-*b* may then transmit the PAPR reduction signals with beam characteristics selected to achieve a desired PAPR level without regard to how much interference this may impose on UE 115-*c* because it is not communicating in that time and/or frequency resource. In some examples, base station 105-*b* may transmit a signal (e.g., PAPR reduction beam 315-*c*) in at least a partially overlapping direction with a serving beam (e.g., serving beam 305-*b*) based on the headroom report.

In some cases, the techniques may be applied to enhance an IAB transmit waveform for PAPR where backhaul and access share a same spectrum in band. In such deployment, the system architecture may attempt to avoid any level of interference from a donor IAB cell in a direction of an IAB node while allowing some level of interference in one or more other directions. The proposed scheme may provide an IAB link between the donor IAB cell and another IAB node with higher MCS and higher transmit power (and thus higher link budget) given permitted measured inter-cell interference for the IAB link.

Figure 4:
FIG. 4 illustrates an example of a resource allocation in accordance with aspects of the present disclosure.
Figure 4:

FIG. 4 illustrates examples of resource allocations 400 and 450 in accordance with aspects of the present disclosure. In some examples, resource allocations 400 and 450 may implement aspects of wireless communication system 100, wireless communication system 200, and wireless communication system 300.

Resource allocation 400 may illustrate a resource allocation in both time and frequency for a PAPR reduction beam i. Resource allocation 400 may illustrate a particular frequency sub-band with five transmission time intervals (TTIs) k, k+1, k+2, k+3, and k+4. In the example of resource allocation 400, an interfering base station may transmit PAPR reduction beam i at +10 dBm during each TTI. Although +10 dBm is shown, it is only shown as an example and any transmission power may be used.

Resource allocation 450 may illustrate a resource allocation in both time and frequency for a PAPR reduction beam i after the interfering base station has received a headroom report associated with one or more neighboring UEs from a neighboring base station based on a measurement configuration transmitted by the interfering base station to both the neighboring base station and neighboring UE(s). For example, based on the headroom report, the interfering base station may conclude that it must lower the transmission power of PAPR reduction beam i in both the k and k+2 TTIs to +3 dBm and +4 dBm, respectively. For instance, one or more neighboring UEs may be communicating in those TTIs and the interfering base station must lower the transmission power in those TTIs in order for the neighboring UEs to achieve a required SNR at its receive antennas. In another example, the interfering base station may conclude from the headroom report that no neighboring UEs are communicating during TTIs k+1 and k+3, so the interfering base station will continue to transmit PAPR reduction beam i at +10 dBm in the particular frequency sub-band. In some cases, this +10 dBm power level may reflect a desired PAPR power level of the interfering base station. In another example, based on the received headroom report, the interfering base station may conclude that PAPR reduction beam i must be transmitted at +15 dBm in the particular frequency sub-band in the k+4 TTI. This could be due to the fact that another PAPR reduction beam in the k+4 TTI, apart from PAPR reduction beam i, had to be reduced in power due to it interfering with another neighboring UE. Consequently, in order to avoid saturation at the transmitter, the interfering base station may increase the power at PAPR reduction beam i.

Figure 5:
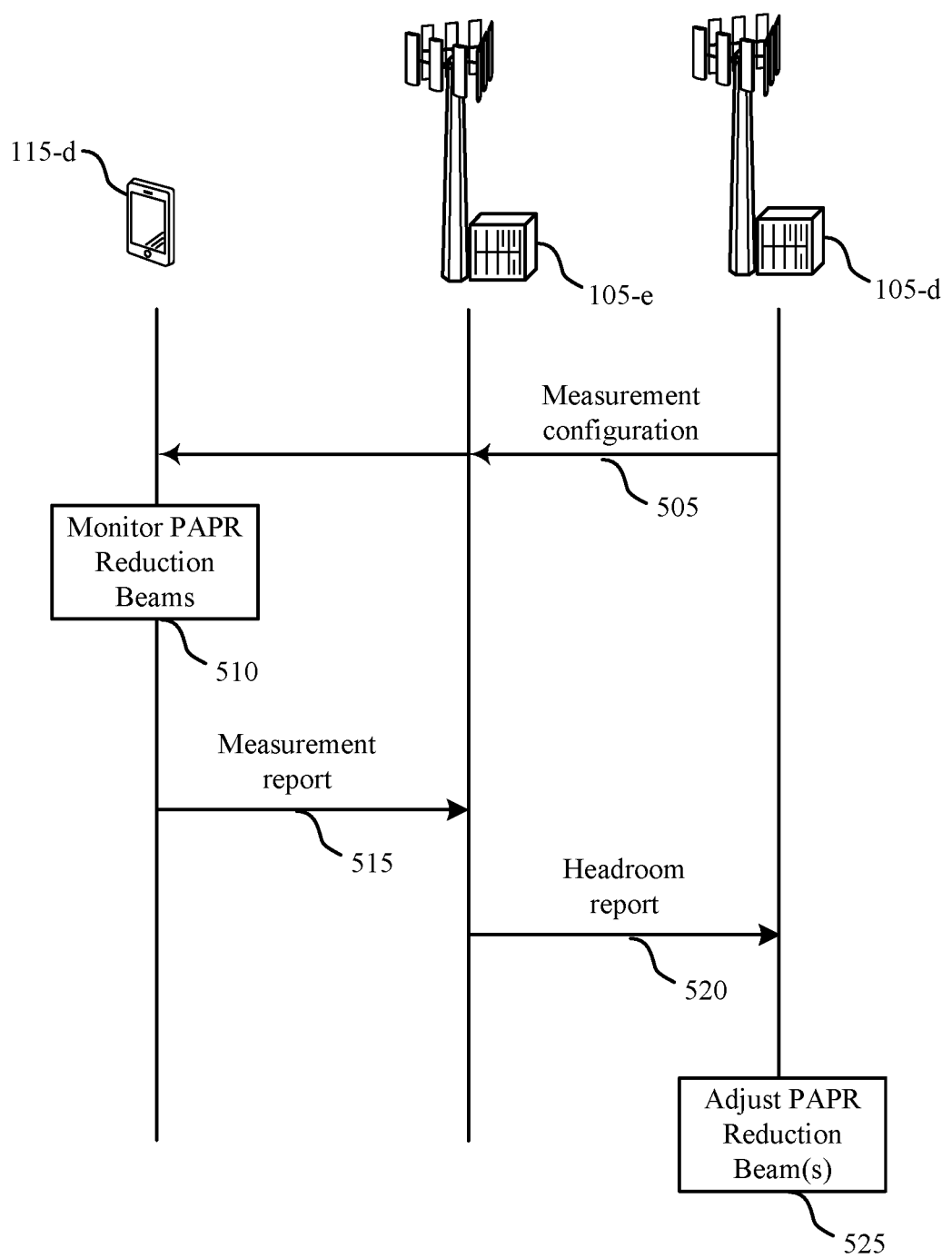
FIG. 5 illustrates an example of a process flow in accordance with aspects of the present disclosure.

FIG. 5 illustrates an example of a process flow 500 in accordance with aspects of the present disclosure. In some examples, process flow 500 may implement aspects of wireless communication system 100, wireless communication system 200, wireless communication system 300, and resource allocations 400 and 450. The process flow 500 may include UE 115-d, base station 105-d, and base station 105-e, which may be respective examples of a UE 115 and a base station 105 as described with reference to FIG. 1.

At 505, base station 105-d may transmit a measurement configuration to base station 105-e. The measurement configuration may contain a configuration of one or more of the PAPR reduction beams transmitted by base station 105-d. The measurement configuration may request energy measurements for specified PAPR beams in both time and frequency resources. In concert with the measurement configuration, base station 105-d may transmit reference signals via PAPR reduction beams on beam resources specified by the measurement configuration. Once base station 105-e receives the measurement configuration, it may forward the measurement configuration to UE 115-d.

At 510, in accordance with the measurement configuration, UE 115-d may monitor the energy levels of the specified beam resources via the reference signals transmitted through the PAPR reduction beams of base station 105-d. At 515, UE 115-d may transmit the energy measurements to base station 105-e in a measurement report. The measurement report may consist of energy measurements per beam, per transmission time interval, per frequency sub-band, or a combination thereof, for each of the PAPR reduction beams specified in the measurement configuration. The base station 105-d may, for example, transmit, via the indicated beam resources, a set of one or more PAPR signals (e.g., one or more references or pilot signals) via the a first set of PAPR reduction beams in accordance with the measurement configuration. The UE 115-d may, for example, measure UE the PAPR reduction measurements beams of neighbor cells (e.g., base station 105-d) and report to serving base station 105-e the measured levels of reception per beam to indicate potential interference due to PAPR reduction signal from neighbor cells.

At 520, base station 105-e may compile the energy measurements and create a headroom report. The headroom report may indicate the available headroom for each PAPR reduction beam such that they do not unduly interfere with the communications of UE 115-d. Base station 105-e may transmit the headroom report to base station 105-d.

At 525, base station 105-d may adjust one or more PAPR reduction beams based on the headroom report. For example, the energy transmitted for each PAPR reduction beam may be adjusted on a beam level, in time, or in frequency. For example, as determined for equation (6), the base station 105 may use the received headroom report to determine the PAPR reduction signal ($\hat{z}-z$), the projection matrix $A \in C^{nT \times nT}$ that scales the power used by the interfering base station to load the PAPR signal onto the respective beams PAPR beams, and the precoding matrix A that applies power headroom constraints for each sub-beam and/or direction, and transmit one or more PAPR reduction signals respectively via one or more PAPR beams accordingly. The base station 105-d may transmit the PAPR reduction signals via the same first set of PAPR reduction beams using the same or adjusted beam characteristics (e.g., the same or different power level, beam direction, etc.), or may use a set of PAPR beams that includes at least one different PAPR beam. The base station 105-d may, for example, transmit a PAPR reduction signal via at least one PAPR reduction beam of the second set of PAPR reduction beams at a different power, a different transmission time interval, or a combination thereof, from a corresponding PAPR reduction beam of the first set of PAPR reduction beams.

Figure 6:
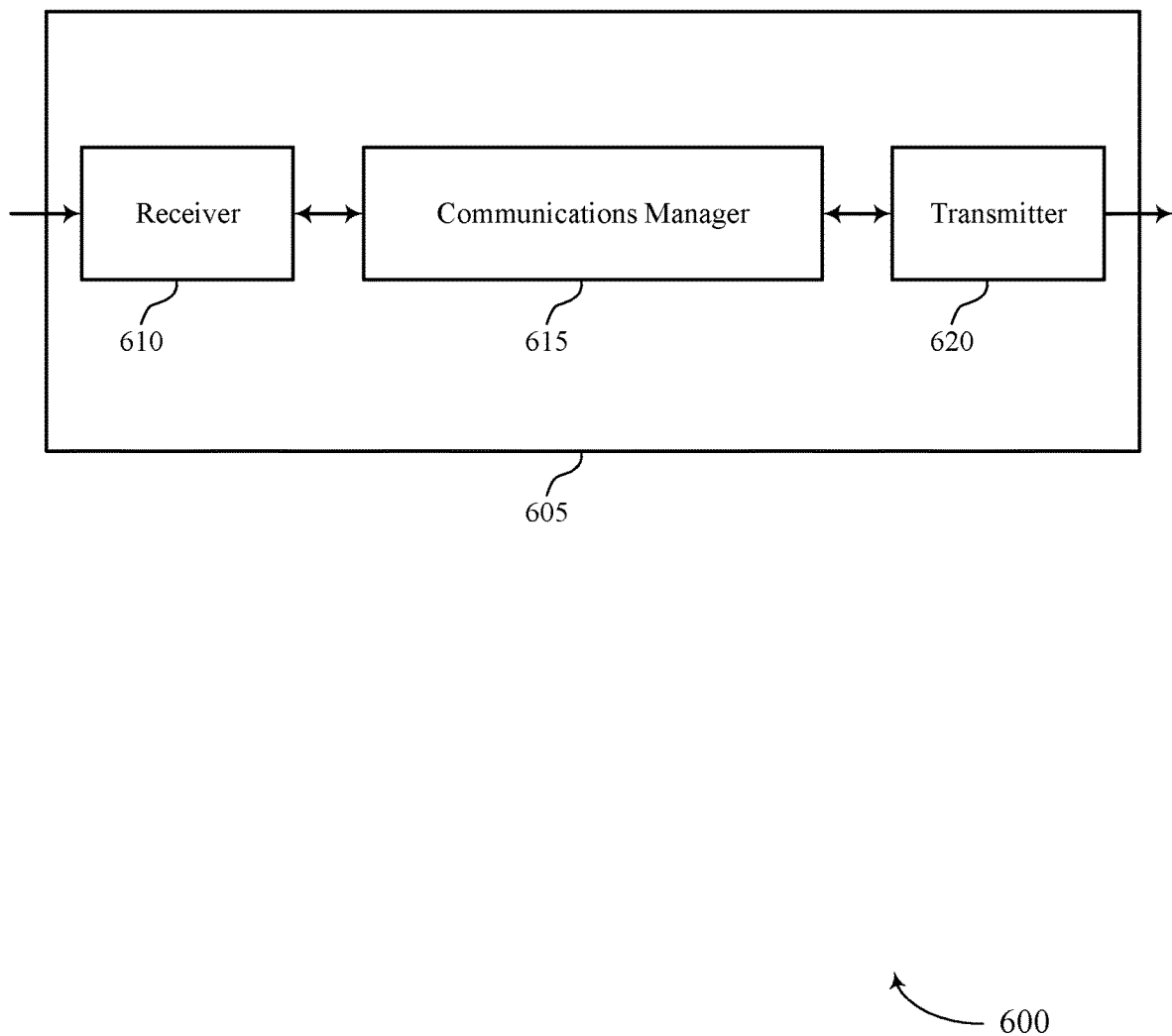
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to waveform optimization of peak-to-average power ratio with inter-cell coordination, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first base station, a measurement configuration measuring a set of beam resources for a set of peak-to-average power ratio (PAPR) reduction beams associated with a second base station, monitor, in accordance with the measurement configuration, energy levels of the set of beam resources via the set of PAPR reduction beams, and transmit, to the first base station, a measurement report indicating the monitored energy levels. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a UE 115 to provide improved quality and reliability of service at the UE 115, as interference at its receive antennas is mitigated.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
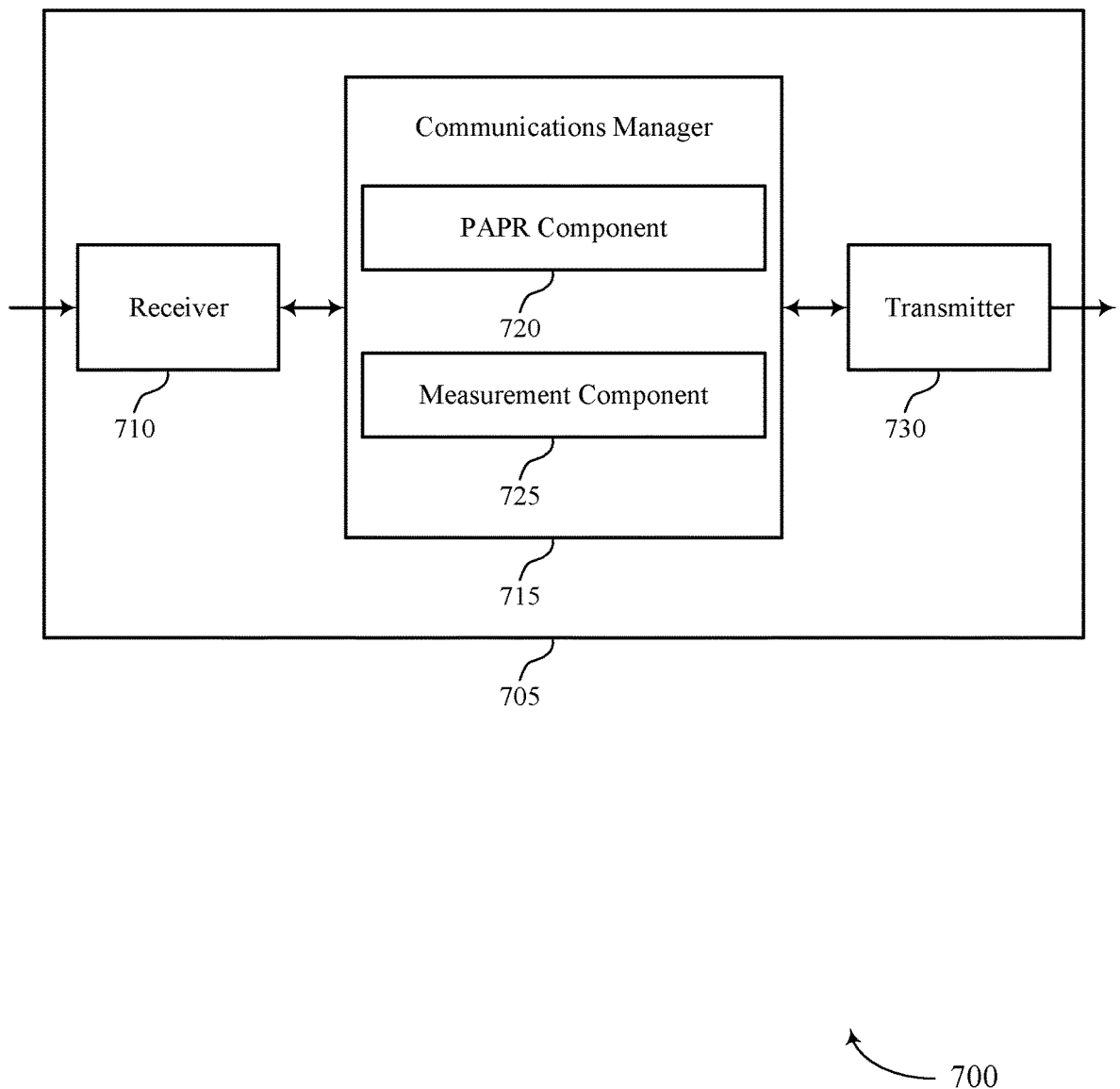

FIG. 7 shows a block diagram 700 of a device 705 in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to waveform optimization of peak-to-average power ratio with inter-cell coordination, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a PAPR component 720 and a measurement component 725. The communications manager 715 may be an example of aspects of the communications manager 910 described herein.

The PAPR component 720 may receive, from a first base station, a measurement configuration measuring a set of beam resources for a set of peak-to-average power ratio (PAPR) reduction beams associated with a second base station.

The measurement component 725 may monitor, in accordance with the measurement configuration, energy levels of the set of beam resources via the set of PAPR reduction beams and transmit, to the first base station, a measurement report indicating the monitored energy levels.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
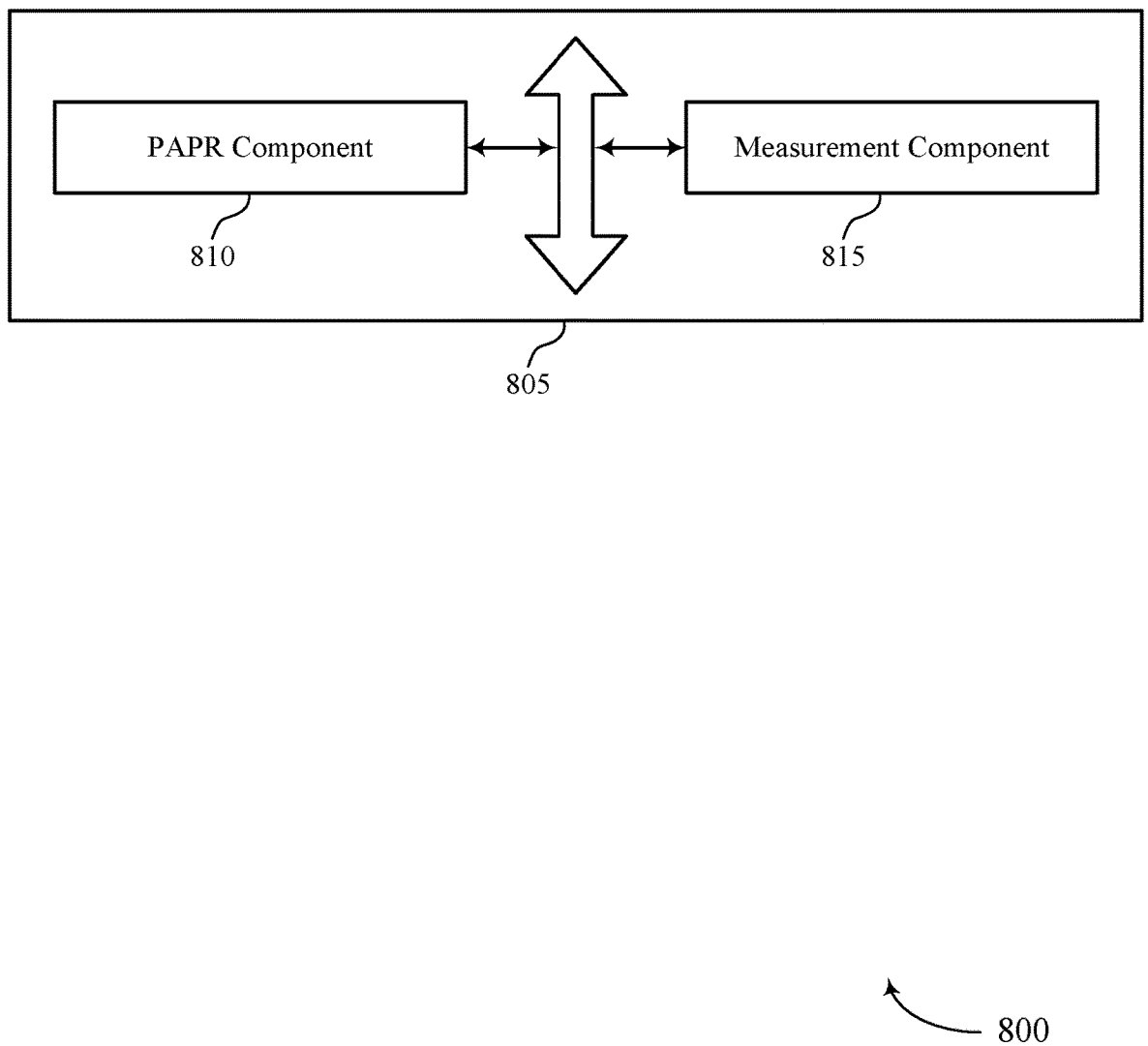
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include a PAPR component 810 and a measurement component 815. Each of these modules may communicate, directly or indirectly, with one another (e.g., via one or more buses).

The PAPR component 810 may receive, from a first base station, a measurement configuration measuring a set of beam resources for a set of peak-to-average power ratio (PAPR) reduction beams associated with a second base station.

The measurement component 815 may monitor, in accordance with the measurement configuration, energy levels of the set of beam resources via the set of PAPR reduction beams.

In some examples, the measurement component 815 may transmit, to the first base station, a measurement report indicating the monitored energy levels.

In some examples, the measurement component 815 may monitor, in accordance with the measurement configuration, for the one or more PAPR reduction beams.

Figure 9:
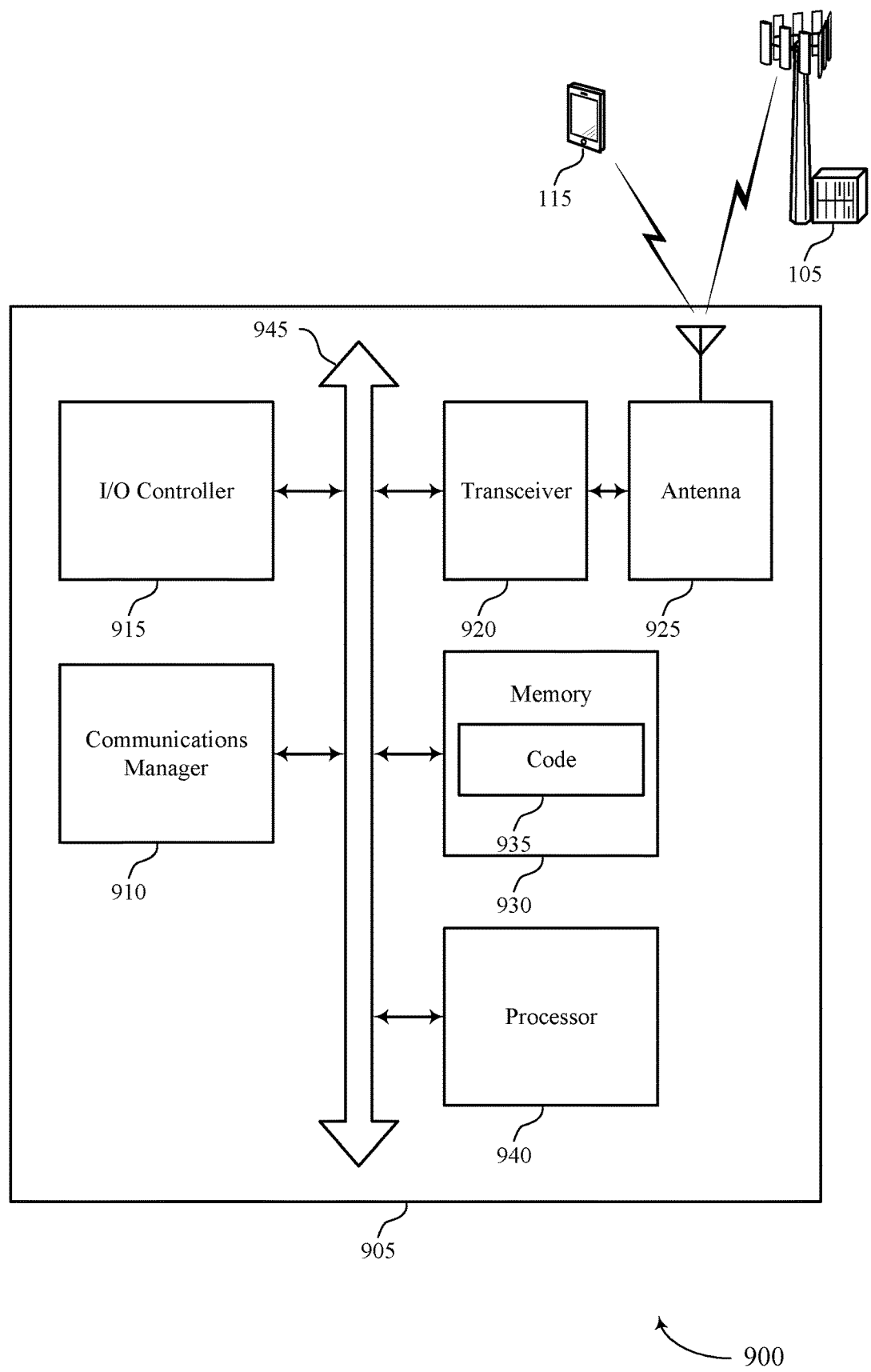
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first base station, a measurement configuration measuring a set of beam resources for a set of peak-to-average power ratio (PAPR) reduction beams associated with a second base station, monitor, in accordance with the measurement configuration, energy levels of the set of beam resources via the set of PAPR reduction beams, and transmit, to the first base station, a measurement report indicating the monitored energy levels.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting waveform optimization of peak-to-average power ratio with inter-cell coordination).

The actions performed by processor 940 may realize one or more potential advantages. Based on interference mitigation techniques, a processor 1340 may realize lower signaling or information overhead which may lead to a reduced number of computations or computational complexity.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
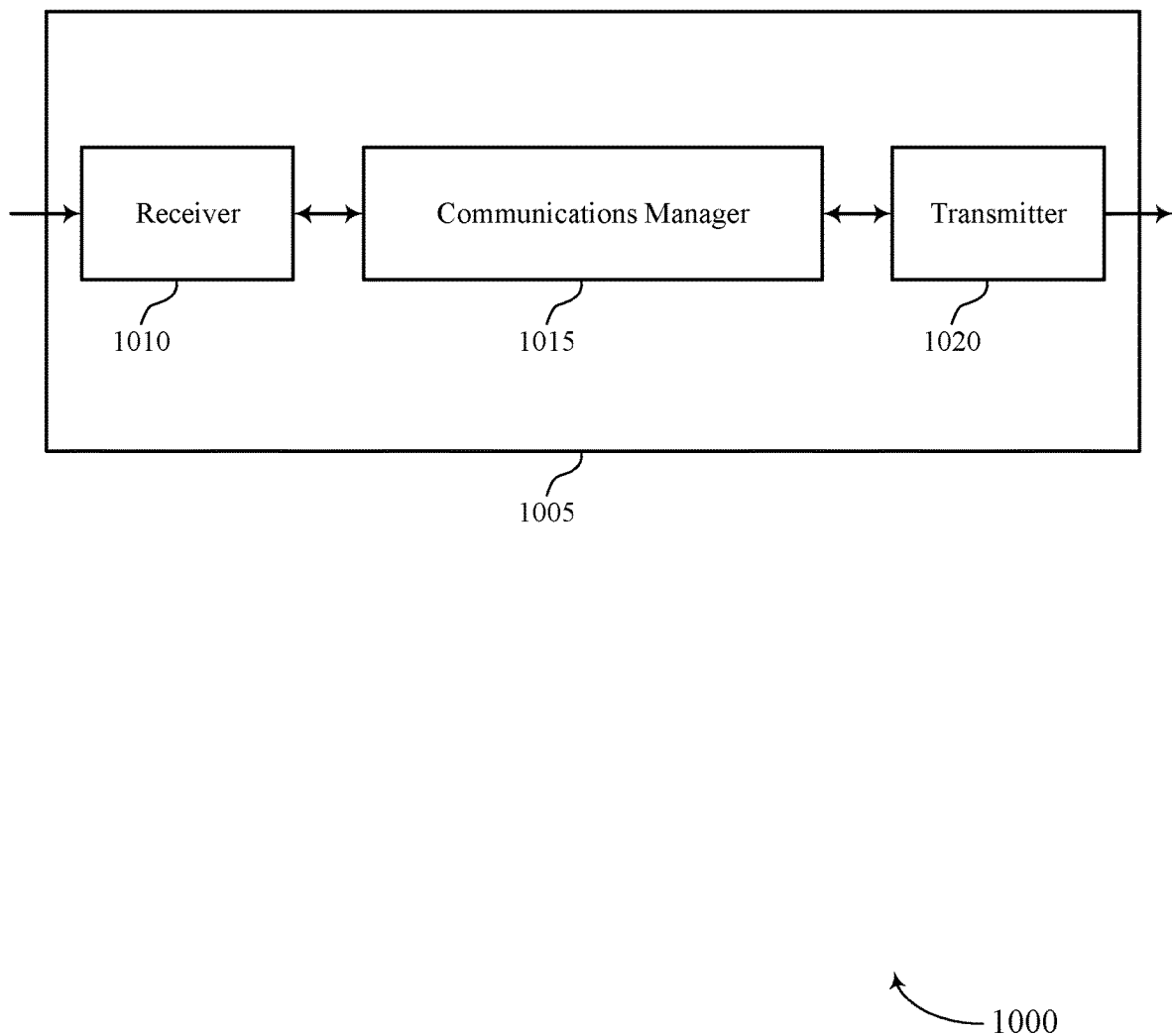
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to waveform optimization of peak-to-average power ratio with inter-cell coordination, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a second base station, a measurement configuration for measurement of a set of beam resources for a first set of peak-to-average power ratio (PAPR) reduction beams, transmit, via the set of beam resources, a set of reference signals via the first set of PAPR reduction beams in accordance with the measurement configuration, transmit signals via a second set of PAPR reduction beams based on the headroom report, and receive a headroom report indicating available headroom based on an energy measurement reported for the set of beam resources by a UE served by the second base station. The communications manager 1015 may also receive, from a second base station, measurement configuration for measurement of a set of beam resources for a set of peak-to-average power ratio (PAPR) reduction beams associated with the second base station, transmit the measurement configuration to a UE served by the first base station, receive, from the UE, a measurement report indicating an energy measurement of the set of beam resources via the set of PAPR reduction beams, and transmit a headroom report indicating available headroom based on the measurement report. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may provide improved quality and reliability of service as interference at receive antennas of a UE 115 is mitigated.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
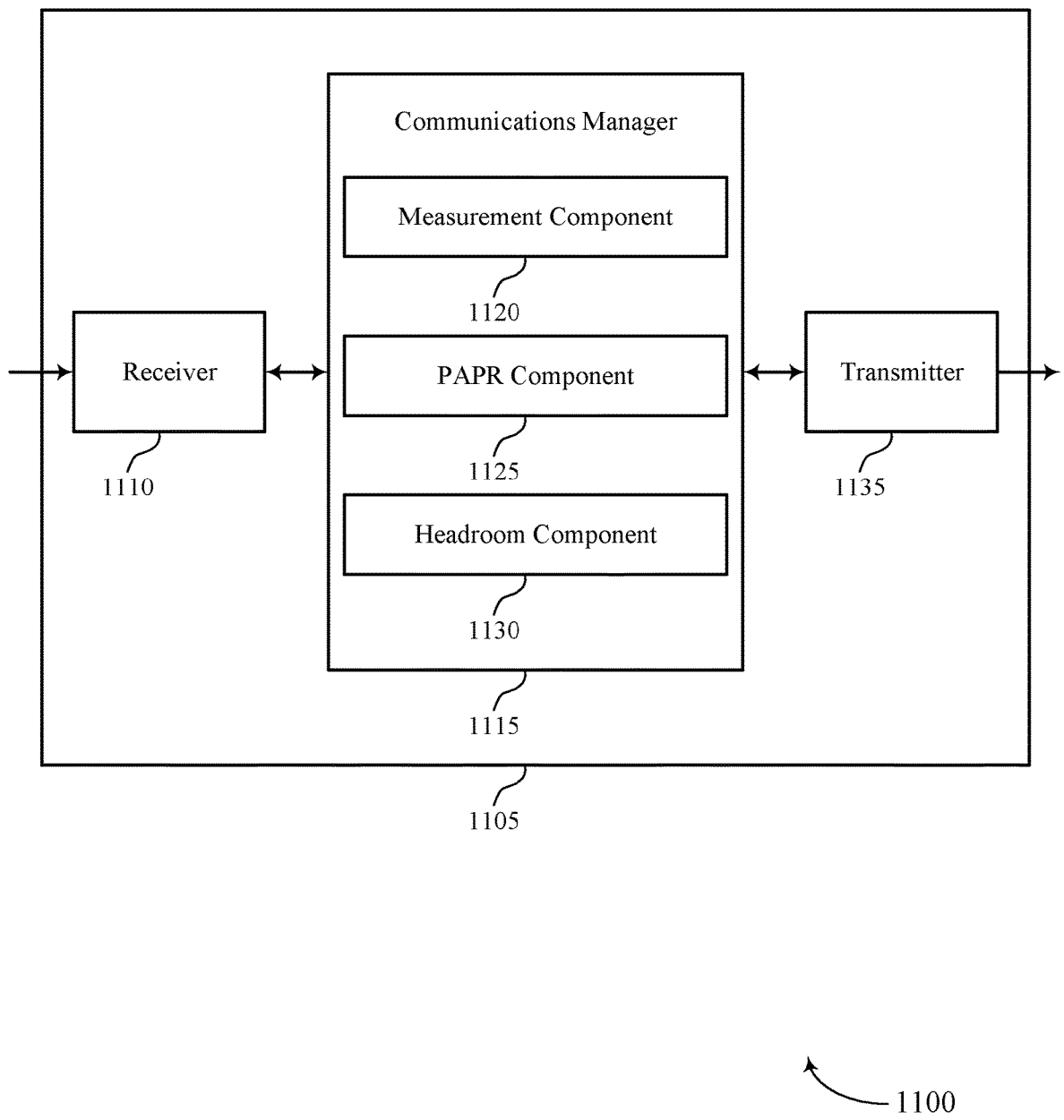

FIG. 11 shows a block diagram 1100 of a device 1105 in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to waveform optimization of peak-to-average power ratio with inter-cell coordination, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a measurement component 1120, a PAPR component 1125, and a headroom component 1130. The communications manager 1115 may be an example of aspects of the communications manager 1310 described herein.

The measurement component 1120 may transmit, to a second base station, a measurement configuration for measurement of a set of beam resources for a first set of peak-to-average power ratio (PAPR) reduction beams.

The PAPR component 1125 may transmit, via the set of beam resources, a set of reference signals via the first set of PAPR reduction beams in accordance with the measurement configuration and transmit signals via a second set of PAPR reduction beams based on the headroom report.

The headroom component 1130 may receive a headroom report indicating available headroom based on an energy measurement reported for the set of beam resources by a UE served by the second base station.

The measurement component 1120 may receive, from a second base station, measurement configuration for measurement of a set of beam resources for a set of peak-to-average power ratio (PAPR) reduction beams associated with the second base station, transmit the measurement configuration to a UE served by the first base station, and receive, from the UE, a measurement report indicating an energy measurement of the set of beam resources via the set of PAPR reduction beams.

The headroom component 1130 may transmit a headroom report indicating available headroom based on the measurement report.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
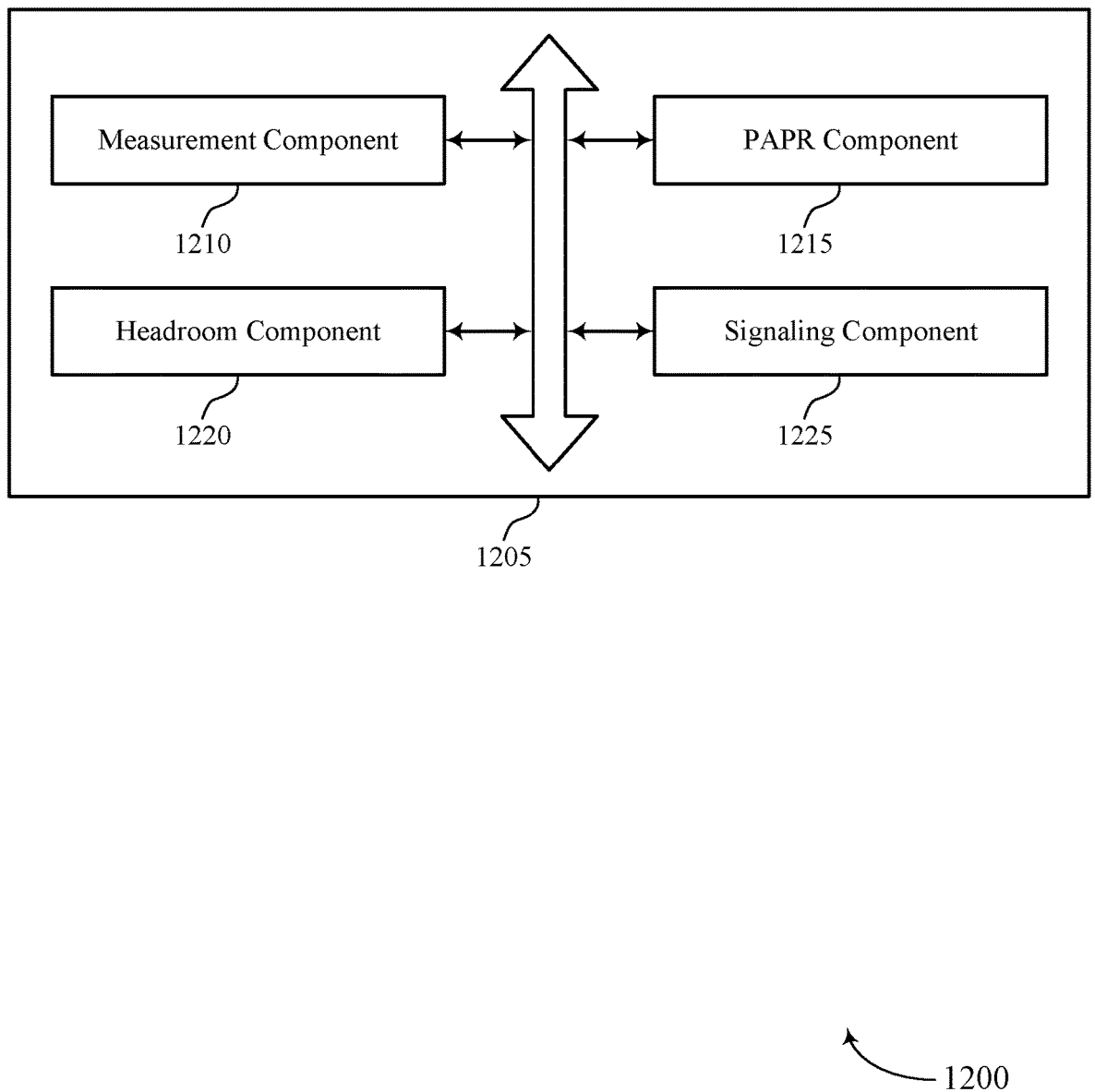
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include a measurement component 1210, a PAPR component 1215, a headroom component 1220, and a signaling component 1225. Each of these modules may communicate, directly or indirectly, with one another (e.g., via one or more buses).

The measurement component 1210 may transmit, to a second base station, a measurement configuration for measurement of a set of beam resources for a first set of peak-to-average power ratio (PAPR) reduction beams.

In some examples, the measurement component 1210 may receive, from a second base station, measurement configuration for measurement of a set of beam resources for a set of peak-to-average power ratio (PAPR) reduction beams associated with the second base station.

In some examples, the measurement component 1210 may transmit the measurement configuration to a UE served by the first base station.

In some examples, the measurement component 1210 may receive, from the UE, a measurement report indicating an energy measurement of the set of beam resources via the set of PAPR reduction beams.

In some examples, the measurement component 1210 may determine the measurement configuration based on the determined one or more PAPR reduction beams.

In some examples, the measurement component 1210 may transmit the measurement configuration via an integrated access and backhaul (IAB) link.

The PAPR component 1215 may transmit, via the set of beam resources, a set of reference signals via the first set of PAPR reduction beams in accordance with the measurement configuration.

In some examples, the PAPR component 1215 may transmit signals via a second set of PAPR reduction beams based on the headroom report.

In some examples, the PAPR component 1215 may transmit a signal via at least one PAPR reduction beam of the second set of PAPR reduction beams at a different power from a corresponding PAPR reduction beam of the first set of PAPR reduction beams based on the headroom report.

In some examples, the PAPR component 1215 may transmit at least one PAPR reduction beam of the second set of PAPR reduction beams in a different transmission time interval within the resource allocation than a corresponding PAPR reduction beam of the first set of PAPR reduction beams.

In some examples, the PAPR component 1215 may transmit a signal via at least one PAPR reduction beam of the second set of PAPR reduction beams with beam characteristics selected to achieve a desired PAPR level based on the determination.

In some examples, the PAPR component 1215 may determine an adjustment of at least one PAPR reduction beam of the second set of PAPR reduction beams based on the headroom report.

In some examples, the PAPR component 1215 may transmit a signal via at least one PAPR reduction beam of the second set of PAPR reduction beams in at least a partially overlapping direction with a serving beam based on the headroom report.

In some examples, the PAPR component 1215 may determine one or more PAPR reduction beams to be used for transmission of the first set of PAPR reduction beams.

The headroom component 1220 may receive a headroom report indicating available headroom based on an energy measurement reported for the set of beam resources by a UE served by the second base station.

In some examples, the headroom component 1220 may transmit a headroom report indicating available headroom based on the measurement report.

In some examples, the headroom component 1220 may determine the available headroom based on the energy measurement and a target Signal to Noise and Interference Ratio (SINR) for decoding of a granted modulation and coding scheme used for transmissions to the UE via the first base station.

The signaling component 1225 may determine that the UE is not scheduled to communicate in a resource in which transmission of the signals is scheduled to occur, and where transmitting the signals via the second set of PAPR reduction beams further includes.

Figure 13:
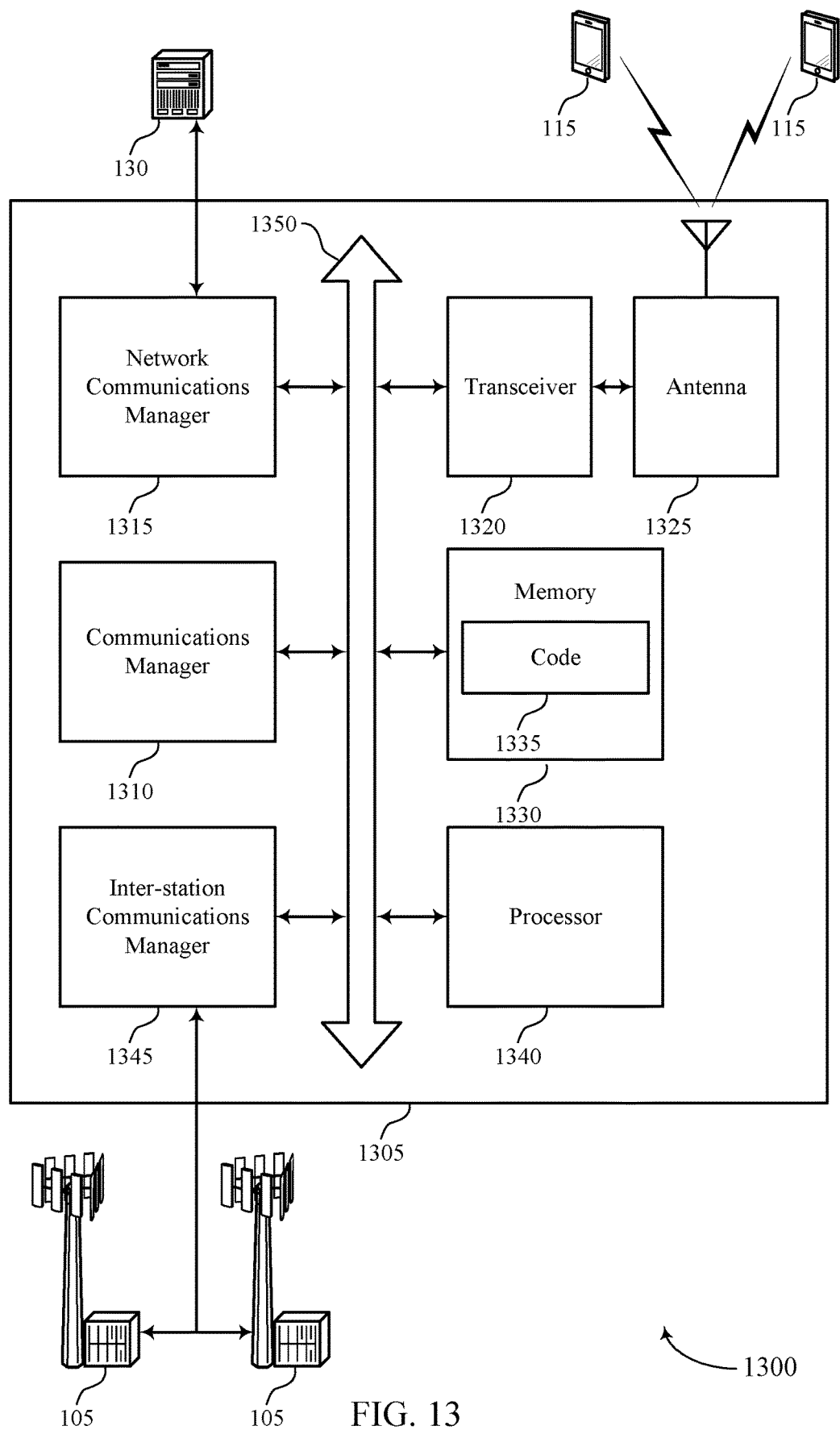
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a second base station, a measurement configuration for measurement of a set of beam resources for a first set of peak-to-average power ratio (PAPR) reduction beams, transmit, via the set of beam resources, a set of reference signals via the first set of PAPR reduction beams in accordance with the measurement configuration, transmit signals via a second set of PAPR reduction beams based on the headroom report, and receive a headroom report indicating available headroom based on an energy measurement reported for the set of beam resources by a UE served by the second base station. The communications manager 1310 may also receive, from a second base station, measurement configuration for measurement of a set of beam resources for a set of peak-to-average power ratio (PAPR) reduction beams associated with the second base station, transmit the measurement configuration to a UE served by the first base station, receive, from the UE, a measurement report indicating an energy measurement of the set of beam resources via the set of PAPR reduction beams, and transmit a headroom report indicating available headroom based on the measurement report.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting waveform optimization of peak-to-average power ratio with inter-cell coordination).

The actions performed by processor 1340 may realize one or more potential advantages. Based on interference mitigation techniques, a processor 1340 may realize lower signaling or information overhead which may lead to a reduced number of computations or computational complexity The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
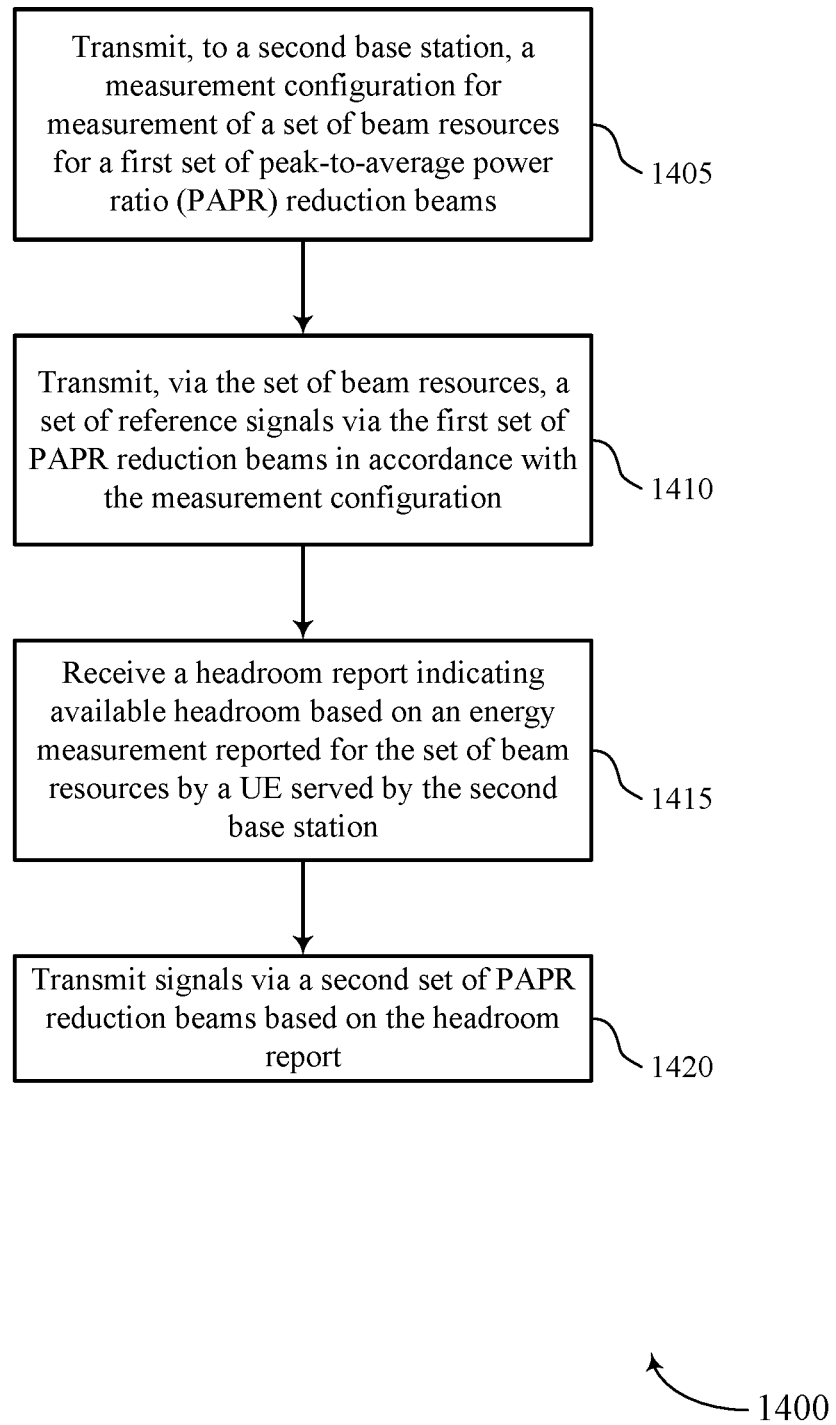
FIG. 14 shows a flowchart illustrating methods in accordance with aspects of the present disclosure.

FIG. 14 shows a flowchart illustrating a method 1400 in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may transmit, to a second base station, a measurement configuration for measurement of a set of beam resources for a first set of peak-to-average power ratio (PAPR) reduction beams. The operations of 1405 may be performed according to the methods described herein. In some examples, aspects of the operations of 1405 may be performed by a measurement component as described with reference to FIGS. 10 through 13.

At 1410, the base station may transmit, via the set of beam resources, a set of reference signals via the first set of PAPR reduction beams in accordance with the measurement configuration. The operations of 1410 may be performed according to the methods described herein. In some examples, aspects of the operations of 1410 may be performed by a PAPR component as described with reference to FIGS. 10 through 13.

At 1415, the base station may receive a headroom report indicating available headroom based on an energy measurement reported for the set of beam resources by a UE served by the second base station. The operations of 1415 may be performed according to the methods described herein. In some examples, aspects of the operations of 1415 may be performed by a headroom component as described with reference to FIGS. 10 through 13.

At 1420, the base station may transmit signals via a second set of PAPR reduction beams based on the headroom report. The operations of 1420 may be performed according to the methods described herein. In some examples, aspects of the operations of 1420 may be performed by a PAPR component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first base station, comprising:
    transmitting, to a second base station, a measurement configuration for measurement of a plurality of beam resources for a first plurality of peak-to-average power ratio (PAPR) reduction beams;
    transmitting, via the plurality of beam resources, a plurality of reference signals via the first plurality of PAPR reduction beams in accordance with the measurement configuration;
    receiving a headroom report indicating available headroom based at least in part on an energy measurement reported for the plurality of beam resources by a user equipment (UE) served by the second base station; and
    transmitting signals via a second plurality of PAPR reduction beams based at least in part on the headroom report.

2. The method of claim 1, wherein transmitting the signals via the second plurality of PAPR reduction beams further comprises:
    transmitting a signal via at least one PAPR reduction beam of the second plurality of PAPR reduction beams at a different power from a corresponding PAPR reduction beam of the first plurality of PAPR reduction beams based at least in part on the headroom report.

3. The method of claim 1, wherein each PAPR reduction beam of the first plurality of PAPR reduction beams is transmitted in a respective transmission time interval of a resource allocation, and wherein transmitting the signals via the second plurality of PAPR reduction beams further comprises:
    transmitting at least one PAPR reduction beam of the second plurality of PAPR reduction beams in a different transmission time interval within the resource allocation than a corresponding PAPR reduction beam of the first plurality of PAPR reduction beams.

4. The method of claim 1, further comprising:
    determining that the UE is not scheduled to communicate in a resource in which transmission of the signals is scheduled to occur, and wherein transmitting the signals via the second plurality of PAPR reduction beams further comprises; and transmitting a signal via at least one PAPR reduction beam of the second plurality of PAPR reduction beams with beam characteristics selected to achieve a desired PAPR level based at least in part on the determination.

5. The method of claim 1, further comprising:
determining an adjustment of at least one PAPR reduction beam of the second plurality of PAPR reduction beams based at least in part on the headroom report.

6. The method of claim 1, wherein transmitting the signals via the second plurality of PAPR reduction beams further comprises:
transmitting a signal via at least one PAPR reduction beam of the second plurality of PAPR reduction beams in at least a partially overlapping direction with a serving beam based at least in part on the headroom report.

7. The method of claim 1, further comprising:
determining one or more PAPR reduction beams to be used for transmission of the first plurality of PAPR reduction beams; and
determining the measurement configuration based at least in part on the determined one or more PAPR reduction beams.

8. The method of claim 1, wherein the headroom report comprises available headroom per beam, per transmission time interval, per frequency sub-band, or a combination thereof, for each of the determined one or more PAPR reduction beams.

9. The method of claim 1, further comprising:
transmitting the measurement configuration via an integrated access and backhaul (IAB) link.

10. The method of claim 9, wherein the IAB link is in a same frequency band as at least one PAPR reduction beam of the first plurality of PAPR reduction beams.

11. An apparatus for wireless communication by a first base station, comprising:
a processor,
memory coupled with the processor; and
instructions stored in the memory and executable by the processor to cause the apparatus to:
transmit, to a second base station, a measurement configuration for measurement of a plurality of beam resources for a first plurality of peak-to-average power ratio (PAPR) reduction beams;
transmit, via the plurality of beam resources, a plurality of reference signals via the first plurality of PAPR reduction beams in accordance with the measurement configuration;
receive a headroom report indicating available headroom based at least in part on an energy measurement reported for the plurality of beam resources by a user equipment (UE) served by the second base station; and
transmit signals via a second plurality of PAPR reduction beams based at least in part on the headroom report.

12. The apparatus of claim 11, further comprising a transmitter, wherein the instructions to transmit the signals via the second plurality of PAPR reduction beams further are executable by the processor to cause the apparatus to:
transmit, via the transmitter, a signal via at least one PAPR reduction beam of the second plurality of PAPR reduction beams at a different power from a corresponding PAPR reduction beam of the first plurality of PAPR reduction beams based at least in part on the headroom report.

13. The apparatus of claim 11, wherein each PAPR reduction beam of the first plurality of PAPR reduction beams is transmitted in a respective transmission time interval of a resource allocation, and comprises:
transmit at least one PAPR reduction beam of the second plurality of PAPR reduction beams in a different transmission time interval within the resource allocation than a corresponding PAPR reduction beam of the first plurality of PAPR reduction beams.

14. The apparatus of claim 11, wherein the instructions are further executable by the processor to cause the apparatus to:
determine that the UE is not scheduled to communicate in a resource in which transmission of the signals is scheduled to occur, and wherein transmitting the signals via the second plurality of PAPR reduction beams further comprises; and
transmit a signal via at least one PAPR reduction beam of the second plurality of PAPR reduction beams with beam characteristics selected to achieve a desired PAPR level based at least in part on the determination.

15. The apparatus of claim 11, wherein the instructions are further executable by the processor to cause the apparatus to:
determine an adjustment of at least one PAPR reduction beam of the second plurality of PAPR reduction beams based at least in part on the headroom report.

16. The apparatus of claim 11, wherein the instructions to transmit the signals via the second plurality of PAPR reduction beams further are executable by the processor to cause the apparatus to:
transmit a signal via at least one PAPR reduction beam of the second plurality of PAPR reduction beams in at least a partially overlapping direction with a serving beam based at least in part on the headroom report.

17. The apparatus of claim 11, wherein the instructions are further executable by the processor to cause the apparatus to:
determine one or more PAPR reduction beams to be used for transmission of the first plurality of PAPR reduction beams; and
determine the measurement configuration based at least in part on the determined one or more PAPR reduction beams.

18. The apparatus of claim 11, wherein the headroom report comprises available headroom per beam, per transmission time interval, per frequency sub-band, or a combination thereof, for each of the determined one or more PAPR reduction beams.

19. The apparatus of claim 11, wherein the instructions are further executable by the processor to cause the apparatus to:
transmit the measurement configuration via an integrated access and backhaul (IAB) link.

20. The apparatus of claim 19, wherein the IAB link is in a same frequency band as at least one PAPR reduction beam of the first plurality of PAPR reduction beams.

21. An apparatus for wireless communication by a first base station, comprising:
means for transmitting, to a second base station, a measurement configuration for measurement of a plurality of beam resources for a first plurality of peak-to-average power ratio (PAPR) reduction beams;
means for transmitting, via the plurality of beam resources, a plurality of reference signals via the first plurality of PAPR reduction beams in accordance with the measurement configuration;
means for receiving a headroom report indicating available headroom based at least in part on an energy measurement reported for the plurality of beam resources by a user equipment (UE) served by the second base station; and means for transmitting signals via a second plurality of PAPR reduction beams based at least in part on the headroom report.

22. The apparatus of claim 21, wherein the means for transmitting the signals via the second plurality of PAPR reduction beams further comprises:

means for transmitting a signal via at least one PAPR reduction beam of the second plurality of PAPR reduction beams at a different power from a corresponding PAPR reduction beam of the first plurality of PAPR reduction beams based at least in part on the headroom report.

23. The apparatus of claim 21, wherein each PAPR reduction beam of the first plurality of PAPR reduction beams is transmitted in a respective transmission time interval of a resource allocation, and comprises:

means for transmitting at least one PAPR reduction beam of the second plurality of PAPR reduction beams in a different transmission time interval within the resource allocation than a corresponding PAPR reduction beam of the first plurality of PAPR reduction beams.

24. The apparatus of claim 21, further comprising:

determining that the UE is not scheduled to communicate in a resource in which transmission of the signals is scheduled to occur, and wherein transmitting the signals via the second plurality of PAPR reduction beams further comprises; and means for transmitting a signal via at least one PAPR reduction beam of the second plurality of PAPR reduction beams with beam characteristics selected to achieve a desired PAPR level based at least in part on the determination.

25. The apparatus of claim 21, further comprising:

means for determining an adjustment of at least one PAPR reduction beam of the second plurality of PAPR reduction beams based at least in part on the headroom report.

26. The apparatus of claim 21, wherein the means for transmitting the signals via the second plurality of PAPR reduction beams further comprises:

means for transmitting a signal via at least one PAPR reduction beam of the second plurality of PAPR reduction beams in at least a partially overlapping direction with a serving beam based at least in part on the headroom report.

27. The apparatus of claim 21, further comprising:

means for determining one or more PAPR reduction beams to be used for transmission of the first plurality of PAPR reduction beams; and means for determining the measurement configuration based at least in part on the determined one or more PAPR reduction beams.

28. The apparatus of claim 21, wherein the headroom report comprises available headroom per beam, per transmission time interval, per frequency sub-band, or a combination thereof, for each of the determined one or more PAPR reduction beams.

29. The apparatus of claim 21, further comprising:

means for transmitting the measurement configuration via an integrated access and backhaul (IAB) link, wherein the IAB link is in a same frequency band as at least one PAPR reduction beam of the first plurality of PAPR reduction beams.

30. A non-transitory computer-readable medium storing code for wireless communication by a first base station, the code comprising instructions executable by a processor to:

transmit, to a second base station, a measurement configuration for measurement of a plurality of beam resources for a first plurality of peak-to-average power ratio (PAPR) reduction beams;

transmit, via the plurality of beam resources, a plurality of reference signals via the first plurality of PAPR reduction beams in accordance with the measurement configuration;

receive a headroom report indicating available headroom based at least in part on an energy measurement reported for the plurality of beam resources by a user equipment (UE) served by the second base station; and transmit signals via a second plurality of PAPR reduction beams based at least in part on the headroom report.

* * * * *